(12) United States Patent
Weder et al.

(10) Patent No.: US 10,436,273 B2
(45) Date of Patent: Oct. 8, 2019

(54) FRICTIONAL DAMPER

(71) Applicant: SUSPA GmbH, Altdorf (DE)

(72) Inventors: Michael Weder, Nürnberg (DE); Michael Bauer, Freihung (DE)

(73) Assignee: SUSPA GmbH, Altdorf (DE)

( * ) Notice: Subject to any disclaimer, the term of this patent is extended or adjusted under 35 U.S.C. 154(b) by 29 days.

(21) Appl. No.: 15/703,071

(22) Filed: Sep. 13, 2017

(65) Prior Publication Data

US 2018/0073589 A1    Mar. 15, 2018

(30) Foreign Application Priority Data

Sep. 14, 2016  (DE) .................. 10 2016 217 484

(51) Int. Cl.
*F16F 7/08*    (2006.01)
*F16F 7/09*    (2006.01)

(52) U.S. Cl.
CPC ............... *F16F 7/085* (2013.01); *F16F 7/09* (2013.01); *F16F 2222/04* (2013.01); *F16F 2228/066* (2013.01); *F16F 2232/08* (2013.01)

(58) Field of Classification Search
CPC .......... F16F 7/085; F16F 7/09; F16F 2222/04; F16F 2228/066; F16F 2232/08
See application file for complete search history.

(56) References Cited

FOREIGN PATENT DOCUMENTS

| DE | 10 85 725 A | 7/1960 | |
|---|---|---|---|
| DE | 21 17 704 A1 | 10/1972 | |
| DE | 3216152 A1 * | 12/1982 | ............. D06F 37/20 |
| DE | 3616373 A1 * | 11/1987 | ............. D06F 37/20 |
| DE | 201 09 958 U1 | 8/2001 | |
| DE | 103 60 784 A1 | 8/2005 | |
| DE | 10 2013 109 196 A1 | 2/2015 | |
| DE | 10 2014 110 770 A1 | 6/2015 | |
| SU | 894 261 A2 | 12/1981 | |
| WO | 2005/065484 A1 | 7/2005 | |

* cited by examiner

*Primary Examiner* — Melanie Torres Williams
(74) *Attorney, Agent, or Firm* — McGlew and Tuttle, P.C.

(57) ABSTRACT

A frictional damper comprises a housing which has a longitudinal axis, a plunger which can be moved along the longitudinal axis, a frictional unit for generating a frictional force on the plunger, the frictional unit comprising at least one friction lining for bearing rubbingly against the plunger, and a friction lining carrier, on which the at least one friction lining is held, the friction lining carrier being arranged such that it can be moved relative to the plunger in the housing between a pulled-out position and a pushed-in position, and a pulled-out friction acting in the pulled-out position, which pulled-out friction is different from the pushed-in friction which acts in the pushed-in position.

18 Claims, 9 Drawing Sheets

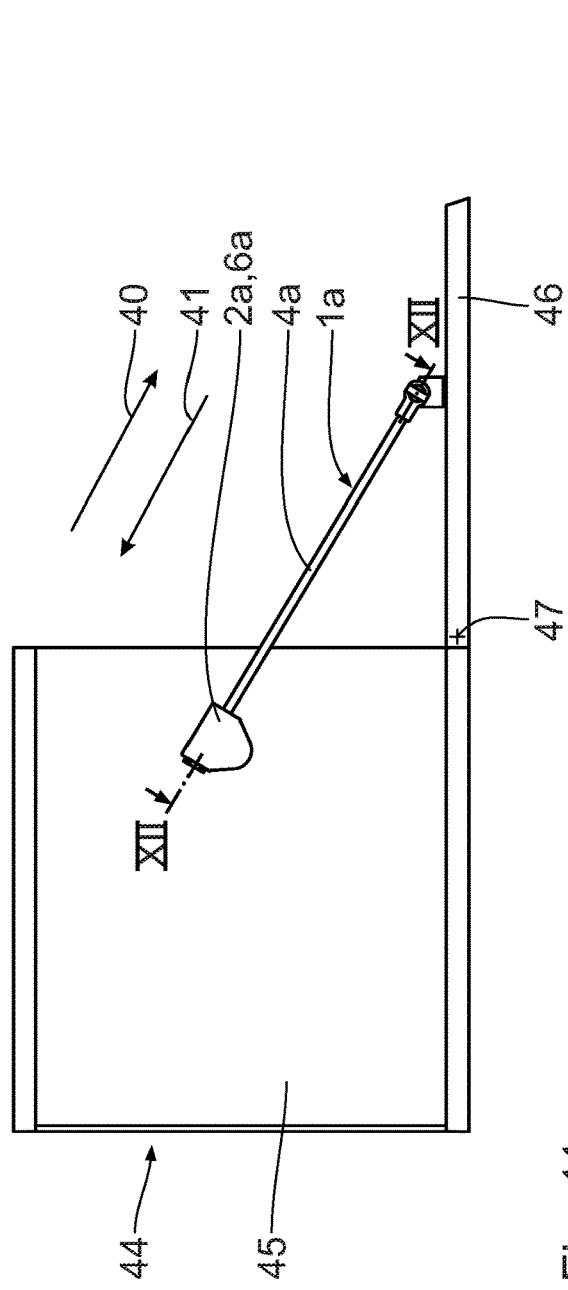
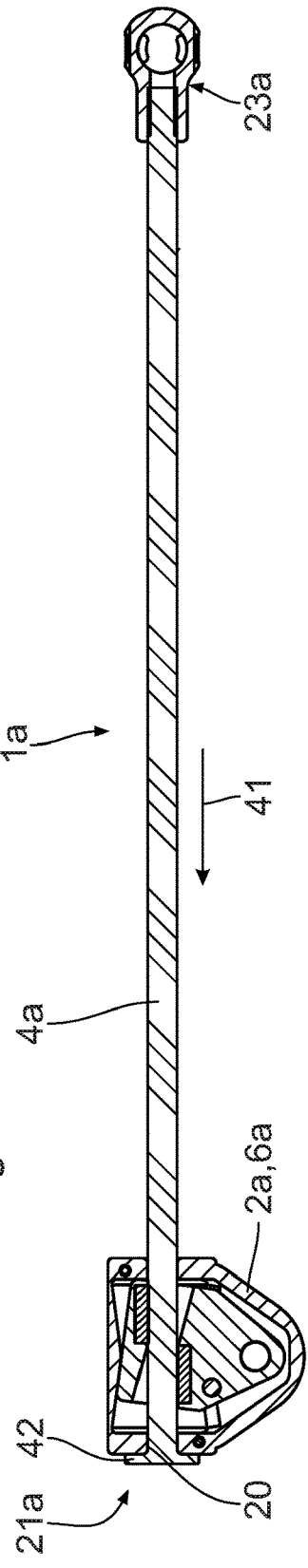
Fig. 11
Fig. 12

FRICTIONAL DAMPER

CROSS-REFERENCES TO RELATED APPLICATIONS

This application claims the priority of German Patent Application, Serial No. 10 2016 217 484.3, filed Sep. 14, 2016, pursuant to 35 U.S.C. 119(a)-(d), the content of which is incorporated herein by reference in its entirety as if fully set forth herein.

FIELD OF THE INVENTION

The invention relates to a frictional damper.

BACKGROUND OF THE INVENTION

Frictional dampers are known from DE 10 85 725 A, DE 10 2013 109 196 A1, DE 103 60 784 A1 and DE 10 2014 110 770 A1, and are used for movement damping in movable components. It is advantageous in certain applications if the damping action of the frictional damper is different in a manner which is dependent on the actuating direction. During the opening of a door, for example of a furniture item or a motor vehicle boot, a comparatively low damping action is not to impede the opening movement. During a closing movement of the door, a comparatively pronounced damping action is to prevent that unintentional slamming of the door as a consequence of gravity leads to noise pollution or damage.

SUMMARY OF THE INVENTION

It is the object of the present invention to improve a frictional damper, in which the damping action is dependent on the actuating direction.

This object is achieved according to the invention by way of a frictional damper comprising a housing which has a longitudinal axis, a plunger which can be moved along the longitudinal axis, a frictional unit for generating a frictional force on the plunger, the frictional unit comprising at least one friction lining for bearing rubbingly against the plunger, a friction lining carrier, on which the at least one friction lining is held.

It has been recognized according to the invention that, in a frictional damper, a direction-dependent damping action is achieved in a simplified manner if a friction lining carrier can be moved between a pulled-out position and a pushed-in position. A frictional unit serves to generate a frictional force on a plunger which can be moved at least in sections in a housing along the longitudinal axis of the said housing. The housing can be of multiple-piece configuration and can have a cylinder housing section and a damping housing section which is connected to the latter. According to one special embodiment, the cylinder housing section can be dispensed with. The housing consists, in particular, exclusively of the damping housing section. The friction lining carrier holds at least one friction lining which serves to bear rubbingly against the plunger. By way of the friction lining bearing rubbingly against the plunger and the plunger being moved along the longitudinal axis either in the pulling-out direction, that is to say out of the housing, or in the pushing-in direction, that is to say into the housing, a frictional force is generated between the plunger and the frictional unit. The friction lining carrier is arranged such that it can be moved in the housing relative to the plunger. A pulled-out friction acts in the pulled-out position. A pushed-in friction acts in the pushed-in position. The pulled-out friction and the pushed-in friction are different. The frictional damper, in particular the frictional unit, acts in a passive manner. This means that an additional activation of the frictional unit for setting the different pulled-out friction and pushed-in friction is superfluous. The different frictional actions are set directly and automatically in a manner which is dependent on the actuating direction of the plunger. The frictional damper according to the invention is of uncomplicated and robust configuration. The frictional damper according to the invention can be produced in a particularly cost-efficient manner.

In the frictional damper wherein the frictional unit interacts with the plunger in such a way that the friction lining carrier is moved into the pulled-out position during a movement of the plunger in the pulling-out direction, and is moved into the pushed-in position during a movement of the plunger in the pushing-in direction, the movement of the friction lining carrier results directly from the movement of the plunger. The friction lining carrier is moved in a passive manner. An active movement of the friction lining carrier, for example by means of a separate actuator, is superfluous. The movement of the friction lining carrier is integrated into the typical actuating sequence of the frictional damper.

Tilting of the friction lining carrier wherein the friction lining carrier is arranged in the housing such that it can be tilted about a tilting axis, the tilting axis being arranged transversely with respect to the longitudinal axis, simplifies the change between the pulled-out position and the pushed-in position. The tilting axis is arranged, in particular, fixedly on the housing.

A tilting pin is provided in the housing, on which tilting pin the friction lining carrier is articulated by way of a tilting opening such that it can be tilted, simplifies the tilting capability of the friction lining carrier. The embodiment of the friction lining carrier wherein the friction lining carrier has two friction lining carrier parts, in particular of mirror-symmetrical configuration, makes particularly cost-efficient production possible. The friction lining carrier can be configured from two friction lining carrier parts of mirror-symmetrical configuration. The friction lining carrier parts are configured at least in regions as half shells. The outlay for the production is reduced.

An embodiment of the housing wherein the housing has two housing parts, in particular of mirror-symmetrical configuration, has substantially the advantages of the embodiment of the friction lining carrier, wherein the friction lining carrier has two friction lining carrier parts, in particular of mirror-symmetrical configuration. It is conceivable that the housing parts are of at least mirror-symmetrical and, in particular, identical configuration.

The embodiment of the frictional damper comprising two, in particular identical, friction linings which, in particular, in each case have a half-shell contour, ensures that stable bearing of the plunger against friction linings is ensured at least in one position of the friction lining carrier, for example in the pulled-out position. The plunger is guided reliably as a result. Robust and, in particular, constant frictional conditions are ensured. Radial yielding (in relation to the longitudinal axis) of the plunger in the friction lining carrier is substantially ruled out. The friction linings have substantially a half shell contour. The half shell contour is an open tubular cross section. The inner contour of the half shell is, in particular, an inner cylindrical circumferential face. The inner contour of the half shell can also be of different configuration. It is essential that the inner contour of the half shell corresponds to the outer contour of the plunger. For example, the plunger can have a square cross-sectional area which is oriented perpendicularly with respect to the longitudinal axis. In this case, the contour of the half shell is of polygonal configuration.

An embodiment of the friction lining carrier with a through opening through which the plunger is guided, makes effective frictional damping possible. The at least one friction lining can be arranged, in the radial direction in relation to the longitudinal axis, between the plunger which is arranged on the inside and the friction lining carrier which is arranged on the outside. In particular, the at least one friction lining is pressed in the radial direction onto the plunger by the friction lining carrier.

An embodiment of the through opening wherein the through opening has a contour which is asymmetrical at least in sections perpendicularly with respect to the longitudinal axis, makes an advantageous switchover between the pulled-out position and the pushed-in position possible. There is an asymmetrical contour of the through opening, for example, by virtue of the fact that the contour has a dividing line. The through opening has, in particular, an asymmetrical inner contour. The asymmetrical inner contour can be of symmetrical configuration in sections and can be configured, for example, as a circle segment. Symmetrical means rotationally symmetrical with respect to the longitudinal axis. The asymmetrical inner contour at any rate has at least one asymmetrical section which is, in particular, of non-round configuration. A plurality of asymmetrical sections which are, in particular, of separate configuration from one another can also be provided. It is essential that the asymmetrical inner contour is not of rotationally symmetrical configuration with regard to the longitudinal axis at least in sections. Asymmetrical means, in particular, not rotationally symmetrical with regard to the longitudinal axis which is oriented perpendicularly with respect to the contour. The dividing line is, in particular, a straight line which intersects, in particular, the longitudinal axis. The dividing line symbolizes a dividing plane which extends along the longitudinal axis. The dividing line can also be of curved or kinked configuration. The dividing line divides the contour of the through opening into a symmetrical, in particular round contour section and an asymmetrical, in particular non-round contour section. The symmetrical contour section and the asymmetrical contour section are separated from one another by way of the dividing line.

An embodiment of the through opening wherein the through opening has a first through opening section and a second through opening section, the first through opening section and the second through opening section having, in particular, in each case one section longitudinal axis, which section longitudinal axes are arranged in a manner which is inclined by an angle of inclination with respect to one another, ensures that the friction lining carrier is arranged either with a first or a second through opening section parallel to the longitudinal axis of the housing in a manner which is dependent on the tilting position. The through opening sections in each case have a section longitudinal axis, which section longitudinal axes are arranged inclined with respect to one another. The section longitudinal axes are oriented, in particular, in such a way that, in the pulled-out position of the friction lining carrier, a first section longitudinal axis is arranged parallel to the longitudinal axis of the housing and a second section longitudinal axis is arranged in an inclined manner with respect to the longitudinal axis of the housing. Accordingly, in the pushed-in position, the second section longitudinal axis is arranged parallel to the longitudinal axis of the housing, and the first section longitudinal axis is arranged in an inclined manner with respect to the longitudinal axis of the housing.

A friction lining receptacle for the at least one friction lining makes reliable and secure receiving of the friction lining on the friction lining carrier possible. The friction lining is held in the friction lining receptacle, in particular, in the radial direction and/or in the axial direction in relation to the longitudinal axis of the housing and/or the section longitudinal axis. The friction lining receptacle has, in particular, a depth which is slightly smaller than the thickness of the friction lining, with the result that the friction lining is pressed onto the plunger permanently in the radial direction. The friction lining receptacle has a length which is oriented along the longitudinal axis and corresponds approximately to the length of the friction lining. The friction lining is then held in the friction lining receptacle in a manner which is reliable and not prestressed axially. It is also conceivable to prestress the friction lining in the axial direction, by the friction lining receptacle having a length which is smaller than the length of the friction lining. As an alternative, it is also possible that the length of the friction lining receptacle is greater than the length of the friction lining. In this case, the frictional damper can have a freewheel function.

In one embodiment of the through opening wherein the through opening has a cross section perpendicularly with respect to the longitudinal axis, which cross section is variable along the longitudinal axis, it is ensured that reliable bearing of the friction lining carrier at least in sections against the plunger is ensured in a manner which is dependent on the tilting position of the friction lining carrier.

A damping housing section according to the invention allows a compact and protected arrangement of small overall size of the components which are required for the frictional damping.

The embodiment of a frictional damper wherein the housing is formed exclusively by the damping housing section and which does not have a cylinder housing, in particular, is of particularly uncomplicated and inexpensive configuration.

A frictional damper wherein the frictional damper has a first fastening element for fastening to a pivotable part, the first fastening element being arranged, in particular, on the damping housing section, makes improved, in particular direct, pivoting fastening of the frictional damper possible to a pivoting part, in particular a furniture element.

Further advantageous refinements, additional features and details of the invention result from the following description of two exemplary embodiments using the drawing.

BRIEF DESCRIPTION OF THE DRAWING

FIG. 11 shows a side view of a furniture item in an open arrangement with the frictional damper according to FIG. 10, FIG. 12 shows a longitudinal section according to sectional line XII-XII in FIG. 11.

DESCRIPTION OF THE PREFERRED EMBODIMENT

Figure 1:
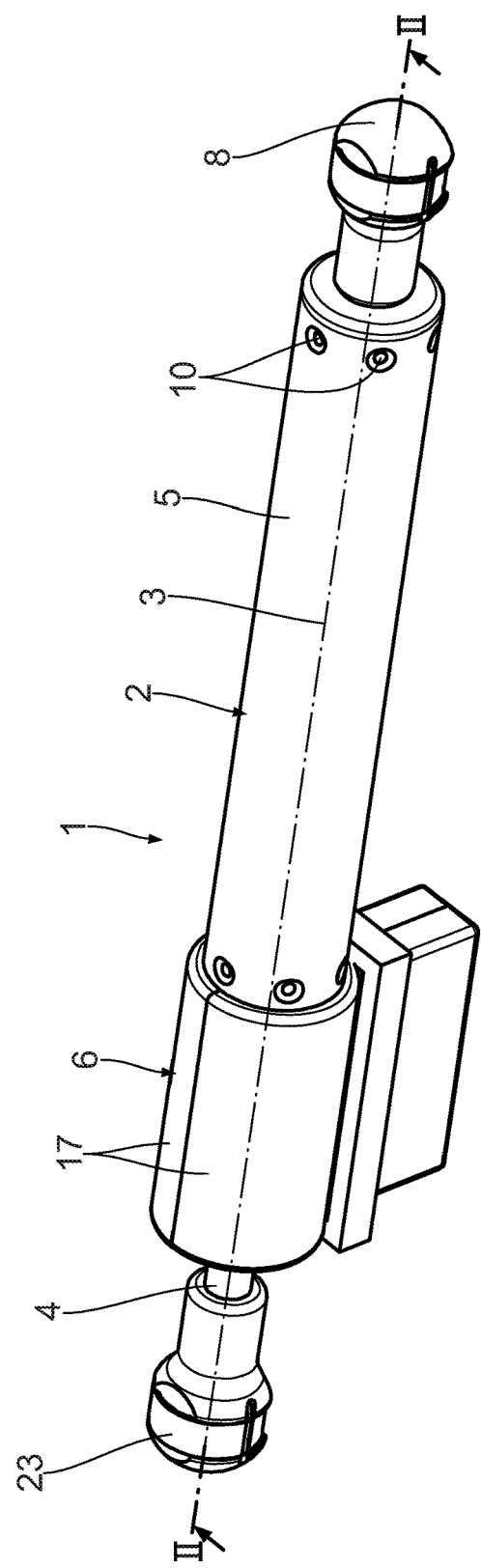
FIG. 1 shows a perspective illustration of a frictional damper according to the invention in accordance with a first exemplary embodiment.

A frictional damper 1 has a housing 2 with a longitudinal axis 3, and a plunger 4 which can be moved along the longitudinal axis 3.

The housing 2 is of multiple-piece configuration and has a cylinder housing section 5 and a damping housing section 6 which is connected to the latter. The cylinder housing section 5 and the damping housing section 6 are arranged behind one another along the longitudinal axis 3. The cylinder housing section 5 and the damping housing section 6 which is connected to it form the common housing 2.

The cylinder housing section 5 can be configured as a cylinder tube. The cylinder housing section 5 can have a different cross-sectional shape in the plane perpendicularly with respect to the longitudinal axis 3, in particular a non-round cross-sectional shape with a non-round inner contour. At one end which lies opposite the plunger 4, the housing 2 is closed by way of a closure plug 7. A first fastening element 8 in the form of a spherical head receptacle is fastened to the closure plug 7. The plunger 4 is arranged with a free end 21 within the housing 2. A pull-out protective means, in particular in the form of a washer, can be arranged at the free end 21, in order to prevent the plunger 4 from unintentionally being pulled completely out of the housing 2. An outer end 22 of the plunger 4 which lies opposite the free end 21 is arranged outside the housing 2. A second fastening element 23 is arranged at the outer end 22, which second fastening element 23 can be, in particular, of identical configuration to the first fastening element 8 as a spherical head receptacle. By way of the fastening elements 8, 23, the frictional damper can be fastened to the components, the relative movement of which with respect to one another is to be damped. For example, the first fastening element is fastened to a furniture body and the second fastening element 23 is fastened to a furniture door. At an end of the cylinder tube which lies opposite the closure plug 7, the cylinder housing section 5 is connected directly to the damping housing section 6 by means of a plug-in plug 9. The plug-in plug 9 is configured in one piece with the damping housing section 6.

The closure plug 7 and the plug-in plug 9 are held on the cylinder tube by way of radially inwardly protruding pressed portions 10. A plurality of, in particular six or eight, pressed portions 10 are provided on the cylinder tube along the outer circumference. The closure plug 7 and the plug-in plug 9 are fixed definitively on the cylinder housing both axially and radially in relation to the longitudinal axis 3.

The damping housing section 6 is of non-round configuration in a plane perpendicularly with respect to the longitudinal axis 3. In an upper region of the damping housing section 6, which upper region is crossed by the longitudinal axis 3, the damping housing section 6 has a substantially hourglass-shaped recess 11. The hourglass-shaped recess 11 has two frustoconical recesses 12 which are arranged so as to taper conically towards one another, and are connected to one another by way of a washer section 13.

A cylindrical tilting pin 14 is provided in the damping housing section 6 below the depression 11. The tilting pin 14 extends along a tilting axis 15 which is oriented perpendicularly with respect to the longitudinal axis 3 of the housing 2. The tilting axis 15 is oriented in a manner which is spaced apart from the longitudinal axis 3. The tilting axis 15 and the longitudinal axis 3 are oriented perpendicularly with respect to one another. The tilting axis 15 and the longitudinal axis 3 do not intersect. The positional relationship of the tilting axis 15 and the longitudinal axis 3 in three-dimensional space is called crooked.

The plug-in plug 9 has a continuous opening 16, through which the plunger 4 can be moved in a guided manner.

The damping housing section 6 is of multiple-piece configuration and has two identical housing parts 17. The housing parts 17 can be separated in a dividing plane which is oriented perpendicularly with respect to the tilting axis 15. The dividing plane has the longitudinal axis 3. The housing parts 17 have, for example, in each case two connecting pins 18 which can be plugged into corresponding connecting openings 19. The two housing parts 17 can be plugged together to form the damping housing section 6.

The housing 2 has a housing opening 20, through which the plunger 4 is guided into the housing 2. The housing opening 20 is arranged on the damping housing section 6, so as to lie opposite the opening 16. The housing opening 20 and the opening 16 are both arranged concentrically with respect to the longitudinal axis 3.

The frictional damper 1 has a frictional unit 24 which comprises two friction linings 25 and a friction lining carrier 26. The friction lining carrier 26 has a carrying plate 27. A tilting opening 28 is provided in the carrying plate 27, by way of which tilting opening 28 the friction lining carrier 26 is arranged in the housing 2, in particular in the damping housing section 6, such that it can be tilted about the tilting axis 15 on the tilting pin 14. A passage section 29 is integrally formed in one piece on the carrier plate 27, which passage section 29 has a through opening 30. The passage section 29 is of hollow configuration. The plunger 4 is guided through the through opening 30. The through opening 30 is of asymmetrical configuration at least in sections in a plane perpendicularly with respect to the longitudinal axis 3. The through opening 30 has a first through opening section 31 and a second through opening section 32 which in each case have a section longitudinal axis 33 and 34, respectively. The first section longitudinal axis 33 and the second section longitudinal axis 34 are arranged in an inclined manner with respect to one another and have an angle of inclination n which is approximately 10° in accordance with the exemplary embodiment which is shown.

Figure 9:
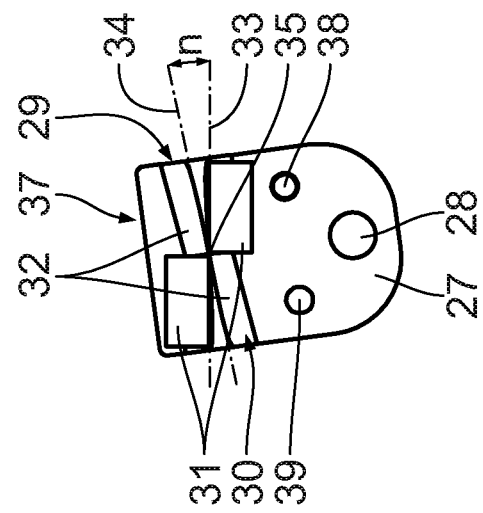
FIG. 9 shows a side view of the friction lining carrier in FIG. 8.
Figure 8:
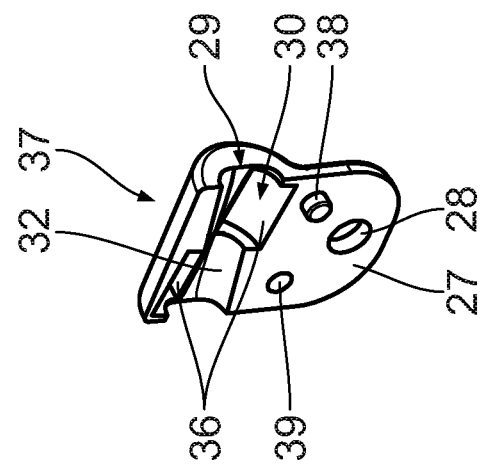
FIG. 8 shows a perspective illustration of a friction lining carrier of the frictional unit in FIG. 4.
Figure 10:
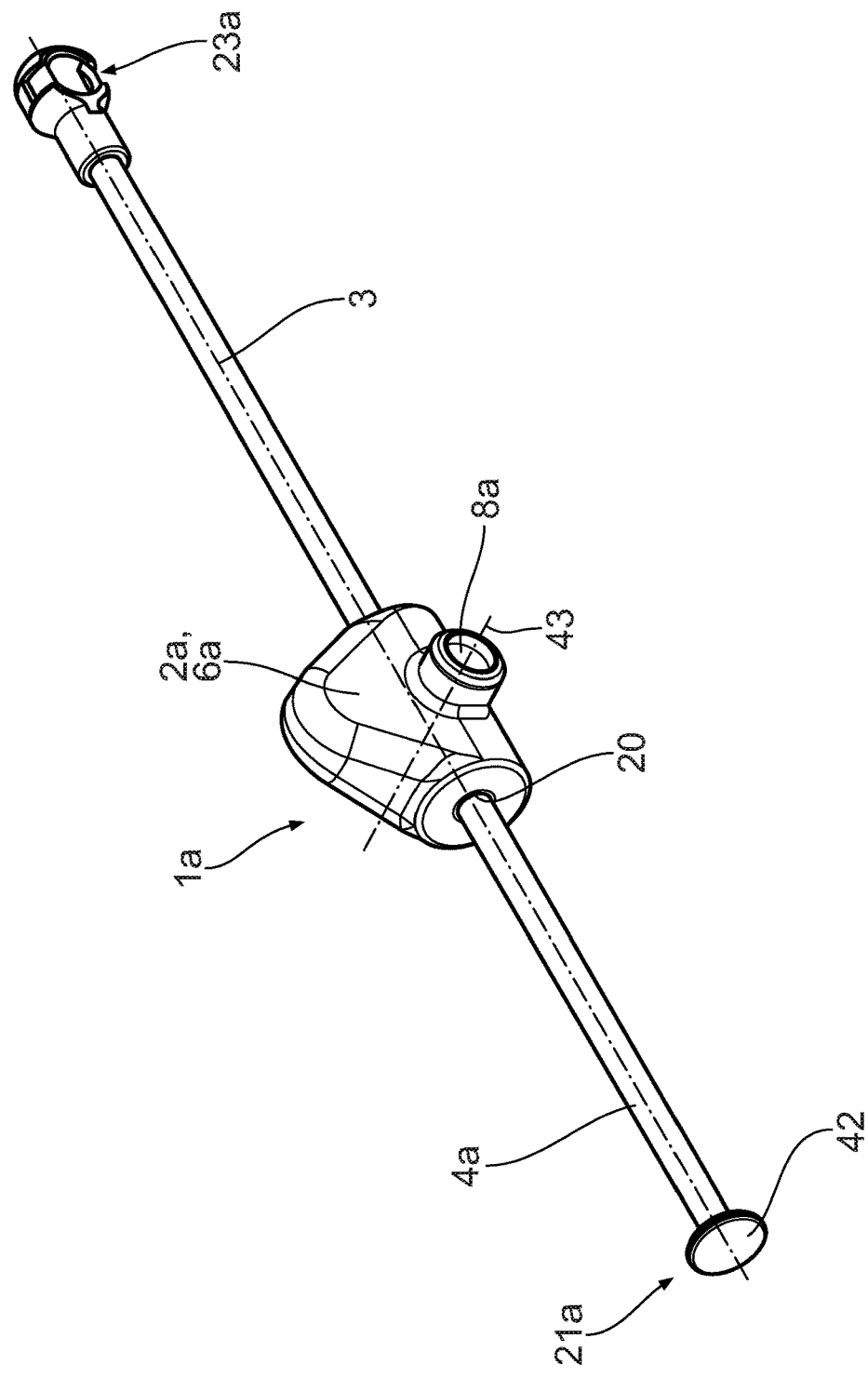
FIG. 10 shows a perspective illustration, corresponding to FIG. 1, of a frictional damper in accordance with a second exemplary embodiment.

The section longitudinal axes 33, 34 intersect at the point of intersection 35. In accordance with the exemplary embodiment which is shown, the first through opening section 31 extends, as shown in FIG. 9, to the left above and to the right below the first section longitudinal axis 33, in relation to the point of intersection 35.

The first through opening section is configured as a semi-cylindrical depression along the first section longitudinal axis 33, the first through opening section 31 having two part sections which are configured separately from one another and are arranged in a mirror-symmetrical manner with respect to the point of intersection 35. Accordingly, the part sections of the second through opening section 32 are configured so as to be mirror-symmetrical with respect to the point of intersection 35 and separate from one another. In accordance with the exemplary embodiment which is shown, in each case one friction lining receptacle 36 is arranged in the first through opening section 31 in the two part sections, into which friction lining receptacle 36 the respective semi-cylindrical shell-shaped friction lining 25 is inserted. The two friction linings 25 are arranged in a Z-shaped manner on the friction lining carrier 26. The through opening 30 has an asymmetrical cross section in a plane perpendicularly with respect to the longitudinal axis 3 of the housing. The first through opening section 31 or the second through opening section 32 extend with in each case an opening angle of 180° in relation to the longitudinal axis 3; on account of the inclined arrangement of the section longitudinal axes 33, 34, the cross-sectional area and/or the cross-sectional contour of the through opening 30 are/is variable along the longitudinal axis 3.

The friction lining carrier 26 can be configured from two mirror-symmetrical friction lining carrier parts 37. The friction lining carrier parts 37 in each case have a connecting bolt 38 and a connecting recess 39 which engage into one another alternately in order to connect the friction lining carrier parts 37 to the friction lining carrier 26.

In the following text, the function of the frictional damper 1 will be described in greater detail using FIGS. 2 and 3. In the case of an actuation of the plunger 4 in the pulling-out direction 40, the plunger 4 comes into contact with the friction linings 25. On account of the static friction which acts initially between the plunger 4 and the friction linings 25, the friction lining carrier 26 is driven by the plunger 4, that is to say is pivoted about the tilting axis 15 into a pulled-out position. The magnitude of the static friction which corresponds to a basic friction and has a value of greater than 0 N can be set, in particular, in a targeted manner A targeted setting capability of the coefficient of static friction is made possible by way of the axial and/or radial prestress, with which the friction lining 25 is arranged in the friction lining carrier 26. In addition, the geometry and material of the friction lining 25 have a direct influence on the magnitude of the static friction. According to FIG. 2, the pivoting movement takes place in the anti-clockwise direction about the tilting axis 15. Further tilting of the friction lining carrier 26 about the tilting axis 15 in the case of the actuation of the plunger 4 in the pulling-out direction 40 is ruled out by way of the friction lining carrier 26 bearing against the housing 2, in particular the damping housing section 6, in particular in an end region of the damping housing section 6, which end region surrounds the housing opening 20, and/or with an upper cylindrical circumferential surface 48 of the damping housing section 6 against the inner face of the frustoconical section 12 which is arranged so as to face away from the housing opening 20.

Figure 2:
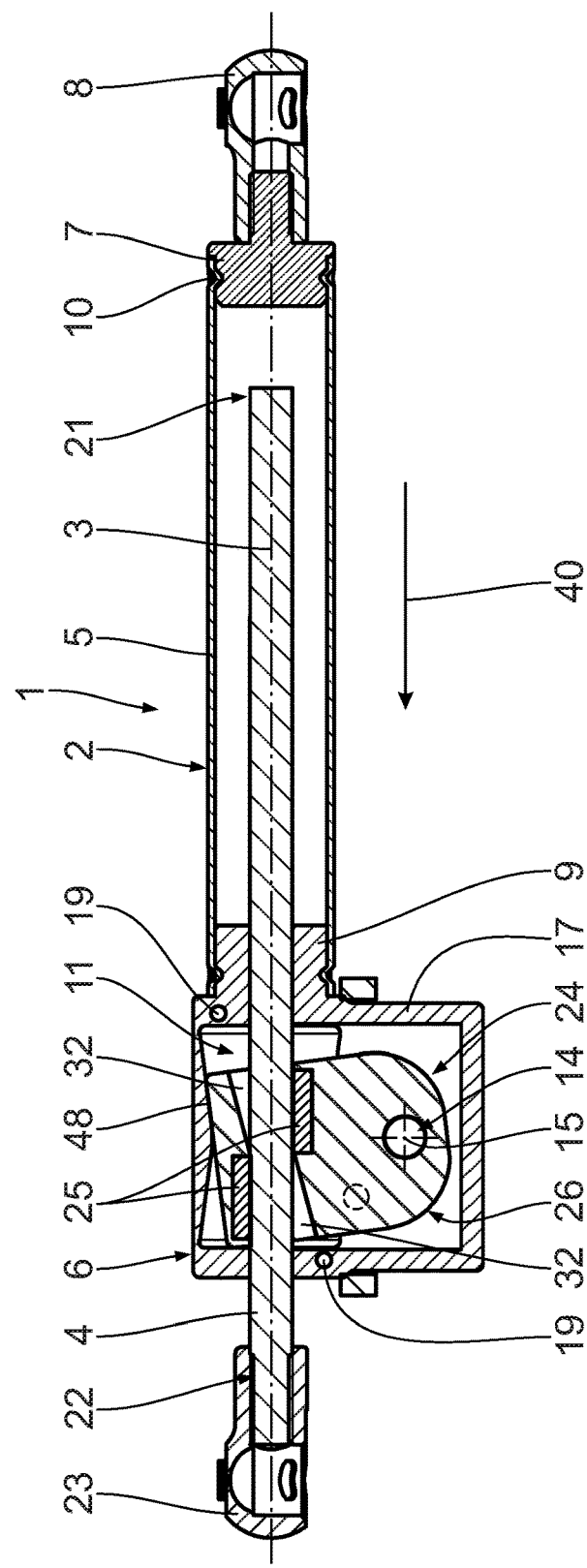
FIG. 2 shows a longitudinal section according to sectional line II-II in FIG. 1, in the case of an actuation of the plunger in the pulling-out direction.

The pulled-out position of the friction lining carrier 26 is shown in FIG. 2. The pulled-out position of the friction lining carrier 26 means that the half shell-shaped friction linings 25 bear in each case with their cylindrical inner face against an outer face of the plunger 4. The friction lining 25 which is shown on the left in FIG. 2 presses from above onto the plunger 4. The friction lining 25 which is shown on the right in FIG. 2 presses from below against the plunger 4. The friction linings 25 are pressed reliably against the outer side of the plunger 4. An axial movement of the plunger 4 is damped frictionally by means of the friction linings 25. In the case of a further actuation of the plunger 4 in the pulling-out direction 40, a frictional action, a pulling-out friction, acts between the plunger 4 and the friction linings 25.

Figure 3:
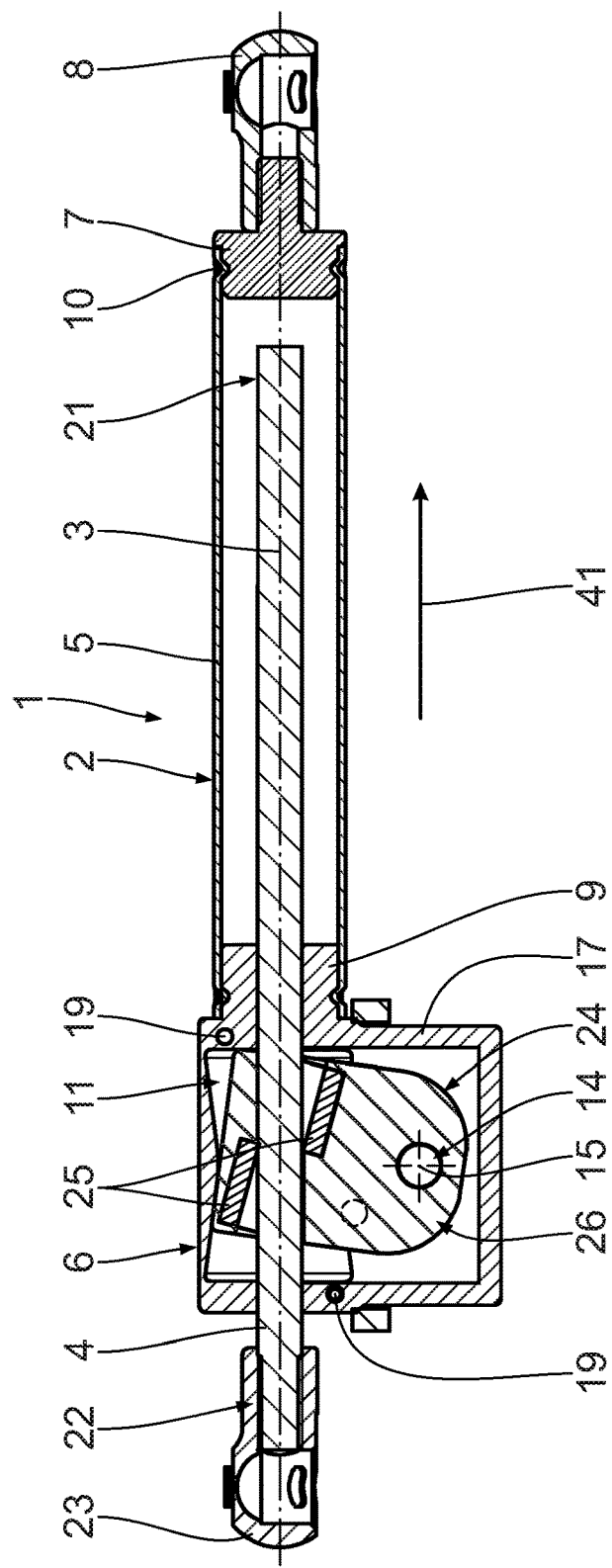
FIG. 3 shows an illustration which corresponds to FIG. 2, in the case of an actuation of the plunger in the pushing-in direction.
Figure 5:
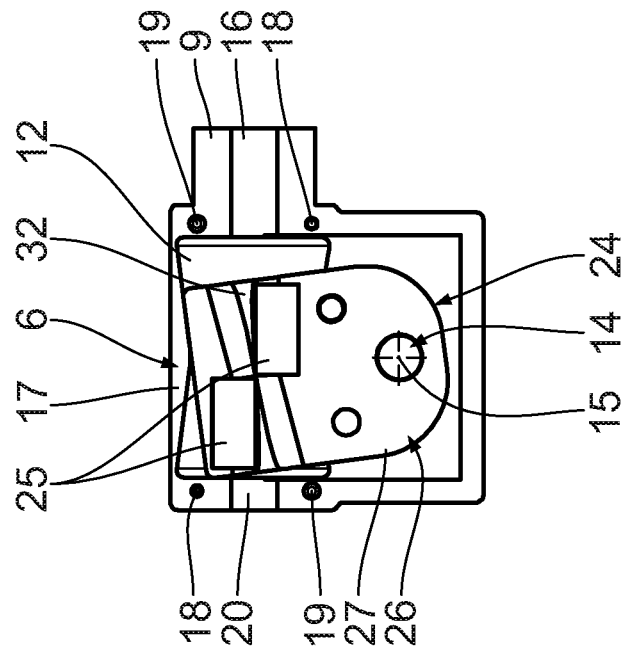
FIG. 5 shows a side view of the frictional unit in FIG. 4.
Figure 4:
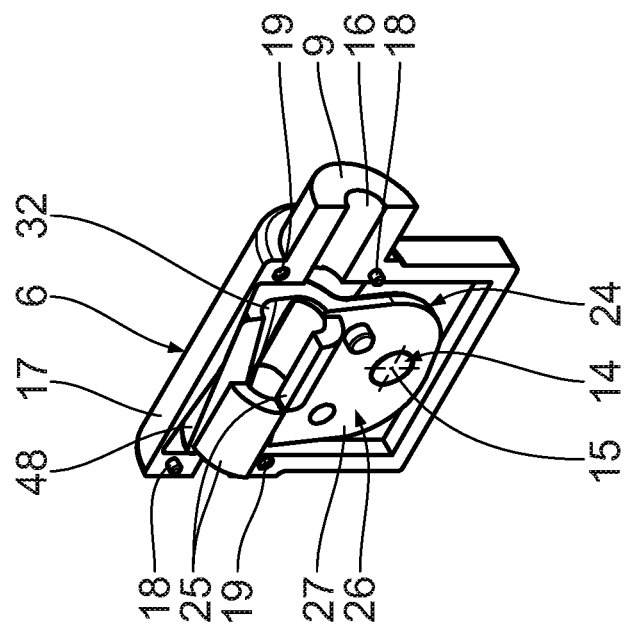
FIG. 4 shows a perspective illustration of a frictional unit of the frictional damper according to FIG. 1.
Figure 7:
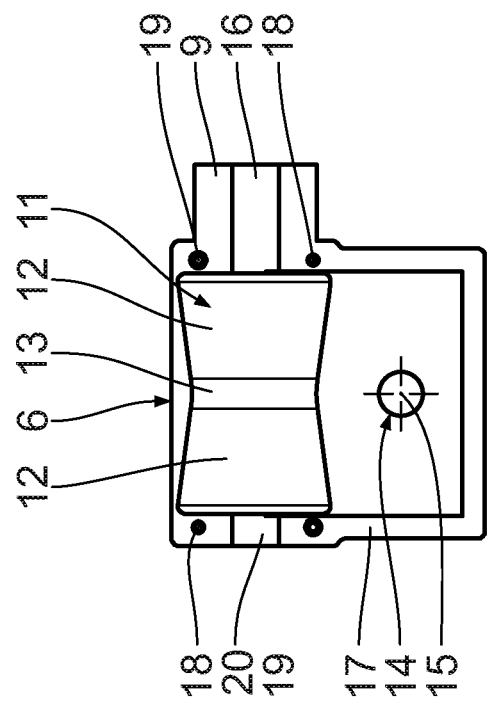
FIG. 7 shows an illustration, corresponding to FIG. 5, of the housing part in FIG. 6.
Figure 6:
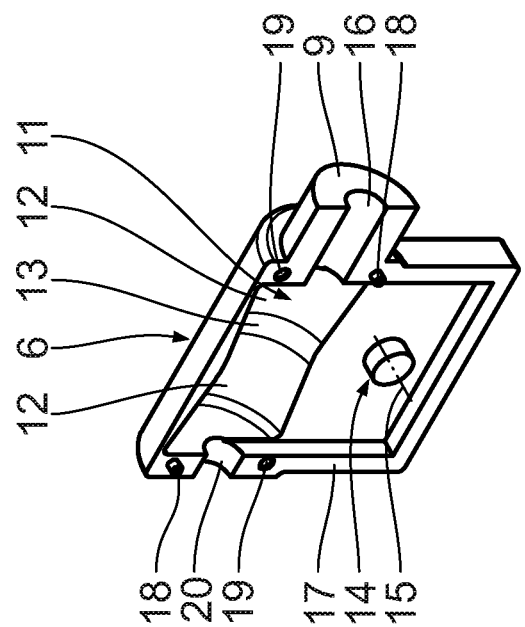
FIG. 6 shows an illustration, corresponding to FIG. 4, of a housing part without a frictional unit.

In the case of an actuation of the plunger 4 in a pushing-in direction 41 which is opposed to the pulling-out direction 40, as shown in FIG. 3, the static friction which acts initially between the plunger 4 and the friction linings 25 brings it about that the friction lining carrier 26 is pivoted in the clockwise direction about the tilting axis 15. The pivoting movement of the friction lining carrier 26 in the clockwise direction about the tilting axis 15 is limited by virtue of the fact that the friction lining carrier 26 bears against the housing 2, in particular against the damping housing section 6, in particular against the plug-in plug 9, and/or with the upper cylindrical circumferential face 48 of the damping housing section 6 against the inner face of the frustoconical section 12 which is arranged so as to face the housing opening 20. Further tilting of the friction lining carrier 26 is prevented as a result.

The friction lining carrier 26 is situated in the pushed-in position. A pushed-in friction is caused in the pushed-in position. In accordance with the exemplary embodiment which is shown, the pulled-out friction and the pushed-in friction differ from one another. In the exemplary embodiment which is shown, the pushed-in friction is substantially not present, since no friction lining is provided in the second through opening section 32. In the first through opening section 31, the friction linings 25 bear in each case with an outer, end-side outer edge from above and below against the plunger 4. This linear contact of the friction linings 25 ensures the required basic friction which ensures the tilting of the friction lining carrier 26 in the case of an actuation in the pulling-out direction. In accordance with the exemplary embodiment which is shown, the second through opening section 32 is configured in sections as a cylinder opening which has an internal diameter which is slightly greater than the external diameter of the plunger 4. In the case of the arrangement of the friction lining carrier 26 in the pushed-in position, the plunger 4 is guided substantially without friction through the through opening 30.

In accordance with a further exemplary embodiment (not shown), it is conceivable to also attach two friction linings on the second through opening section. A different frictional action according to the invention can be achieved, for example, by virtue of the fact that different materials of the friction linings are used. It is also conceivable to achieve a different frictional action by virtue of the fact that the friction linings in the first and second through opening section 31, 32 are arranged with different pressing forces. It goes without saying that it is also possible in accordance with a further exemplary embodiment (not shown) to equip the first through opening section 31 without friction linings and to provide friction linings only on the second through opening section 32. In an embodiment of this type, an increased friction in the pushing-in direction 41 and substantially no friction in the pulling-out direction 40 would be achieved.

A second exemplary embodiment of the invention will be described in the following text with reference to FIGS. 10 to 14. Structurally identical parts are given the same reference numerals as in the first exemplary embodiment, to the description of which reference is made hereby. Structurally different but functionally identical parts are given the same reference numerals with an added a.

The essential difference of the frictional damper 1a consists in that the housing 2a does not have a cylinder housing section. The housing 2a comprises exclusively the damping housing section 6a.

The plunger 4a is guided through the housing 2a and is arranged in an exposed manner on both sides of the housing 2a.

A pulling-out stopping element 42 is provided at the free end 21a of the plunger 4a, which pulling-out stopping element 42 is integrally formed in one piece on the plunger 4a in accordance with the exemplary embodiment which is shown. The pulling-out stopping element 42 is of washer-shaped configuration and has a diameter perpendicularly with respect to the longitudinal axis 3, which diameter is greater than the diameter of the housing opening 20.

The first fastening element 8a is arranged on the outer side of the housing 2a, in particular on the damping housing section 6a. The first fastening element 8a is configured in the form of a receiving stub which is integrally formed, in particular, in one piece on the housing 2a, in particular on the damping housing section 6a. The receiving stub is of sleeve-shaped configuration and can interact on a receiving pin (not shown) on the furniture element 44 for a pivotable connection. In particular, a latching element can be provided on an inner side of the receiving stub, in order to axially set cure, in particular to latch, the receiving pin which is introduced into the receiving stub. Undesired release of the receiving stub from the receiving pin is prevented as a result.

By way of the first fastening element 8a, the frictional damper 1a, in particular with the housing 2a, is articulated such that it can be pivoted on the furniture element 44, in particular on a furniture body 45, about a housing pivot axis 43. A furniture door 46 is articulated pivotably on the furniture body 45. By way of the second fastening element 23a, the frictional damper 1a is articulated pivotably on the furniture door 46.

The housing pivot axis 43 is oriented perpendicularly with respect to the longitudinal axis 3. The housing pivot axis 43 intersects the longitudinal axis 3.

In the following text, the function of the frictional damper 1a in accordance with the second exemplary embodiment will be described in greater detail. Proceeding from the closed arrangement of the furniture element 44 in FIG. 13, the furniture door 46 is pivoted for opening purposes about the furniture element pivot axis 47 with respect to the furniture body 45. With the furniture door 46, the plunger 4a which is articulated by way of the second fastening element 23a on the furniture door 46 is moved along the pulling-out direction 40 relative to the housing 2a.

By virtue of the fact that the housing 2a is articulated pivotably on the furniture body 45, the housing 2a can pivot about the housing pivot axis 43. This ensures that the housing 2a follows the pivoting movement of the furniture door 46. It is ensured that the frictional damper 1a is articulated on the furniture element 44 in such a way that the longitudinal axis 3 is oriented parallel to the pulling-out direction 40 and/or the pushing-in direction 41. The inclination of the pulling-out direction 40 and/or the pushing-in direction 41 is dependent on the pivoting angle of the furniture door 46 with respect to the furniture body 45. FIG. 11 shows the pulling-out direction 40 and the pushing-in direction 41 for the pivoting angle of the furniture door of 90° with respect to the furniture body 45. The smaller the pivoting angle of the furniture door 46, the lower the inclination of the pulling-out direction 40 and/or the pushing-in direction 41 with respect to the horizontal in FIG. 11.

Figure 13:
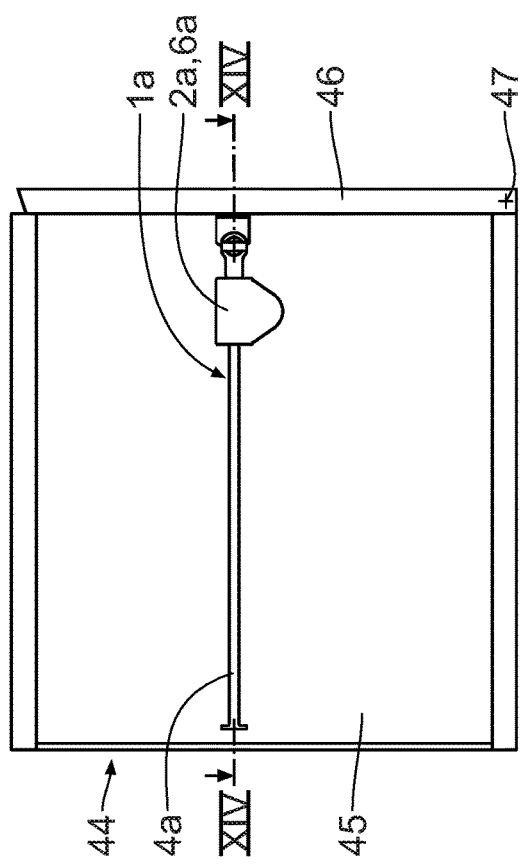
FIG. 13 shows an illustration, corresponding to FIG. 11, of the furniture item in a closed arrangement.

In FIG. 13, the pushing-in direction 41 and the pulling-out direction 40 are oriented horizontally.

Figure 14:
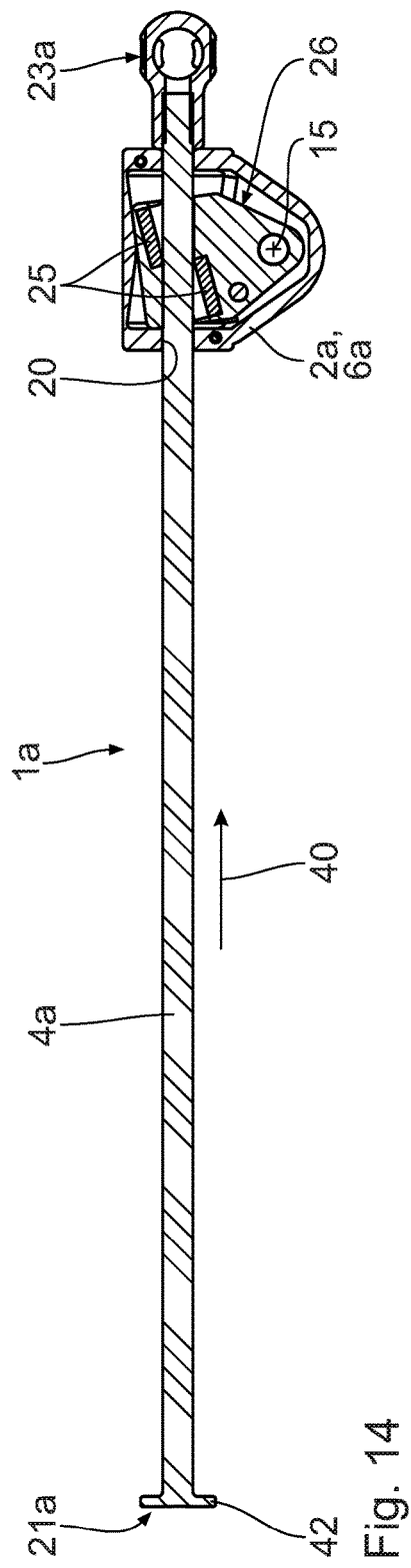
FIG. 14 shows a longitudinal section according to sectional line XIV-XIV in FIG. 13.

By way of the opening of the furniture door 46, the plunger 4a according to FIG. 14 is moved to the right along the pulling-out direction 40 with respect to the housing 2a. As a result of the frictional contact of the friction linings 25 on the plunger 4a, the friction lining carrier 26 is pivoted about the tilting axis 15 in the clockwise direction into the position according to FIG. 12. In this position, the friction linings 25 bear substantially with a cylindrical half shell face against the plunger 4a and cause a maximum frictional effect. In the pulling-out direction 40, the frictional damper 1a causes (in particular, maximum) frictional damping.

In the case of a closing movement of the furniture door 46 with respect to the furniture body 45, the plunger 4a is moved along the pushing-in direction 41 with respect to the housing 2a. As a consequence of the static friction between the friction linings 25 and the plunger 4a, the friction linings 25 are moved with the friction lining carrier 26 about the tilting axis 15 in the anti-clockwise direction into the tilting position which is shown in FIG. 14. In this position, the friction lining carrier 26 with the friction linings 25 causes a minimum frictional action and, in particular, no frictional action. The function of the frictional damper 1a is substantially identical to that of the frictional damper 1 in accordance with the first exemplary embodiment.

What is claimed is:

1. A frictional damper comprising:
   a housing having a longitudinal axis;
   a plunger movable along the longitudinal axis;
   a frictional unit for generating a frictional force on the plunger, the frictional unit comprising at least one friction lining for bearing rubbingly against the plunger, the frictional unit further comprising a friction lining carrier, the at least one friction lining being held on the friction lining carrier, the friction lining carrier being arranged such that the friction lining carrier is movable relative to the plunger in the housing between a pulled-out position and a pushed-in position, wherein a pulled-out friction acts in the pulled-out position, the pulled-out friction being different from a pushed-in friction which acts in the pushed-in position, the friction lining carrier being arranged in the housing such that the friction lining carrier can be tilted about a tilting axis, the tilting axis being arranged transversely with respect to the longitudinal axis, wherein a tilting pin is provided in the housing, the friction lining carrier being articulated on the tilting pin via a tilting opening such that the friction lining carrier can be tilted.

2. A frictional damper according to claim 1, wherein the frictional unit interacts with the plunger such that the friction lining carrier is moved into the pulled-out position during a movement of the plunger in the pulling-out direction, and the friction lining carrier is moved into the pushed-in position during a movement of the plunger in the pushing-in direction.

3. A frictional damper according to claim 1, wherein the tilting axis is arranged perpendicular with respect to the longitudinal axis.

4. A frictional damper according to claim 1, wherein the friction lining carrier has two friction lining carrier parts.

5. A frictional damper according to claim 4, wherein the friction lining carrier has two friction lining carrier parts of mirror-symmetrical configuration.

6. A frictional damper according to claim 1, wherein the housing has two housing parts.

7. A frictional damper according to claim 6, wherein the housing has two housing parts of mirror symmetrical configuration.

8. A frictional damper according to claim 1, wherein the frictional unit comprises another friction lining to provide two friction linings which have a half-shell contour.

9. A frictional damper according to claim 8, wherein the frictional unit comprises another friction lining to provide two friction linings, the friction linings being identical, each of the friction linings having a half-shell contour.

10. A frictional damper according to claim 1, wherein the friction lining carrier has a through opening, the plunger being guided through the through opening.

11. A frictional damper according to claim 10, wherein the through opening has a first through opening section and a second through opening section, the first through opening section and the second through opening section having one section longitudinal axis, to provide section longitudinal axes, the section longitudinal axes being arranged inclined by an angle of inclination with respect to one another.

12. A frictional damper according to claim 10, wherein the through opening has a first through opening section and a second through opening section, each of the first through opening section and the second through opening section having one section longitudinal axis to provide section longitudinal axes, the section longitudinal axes being arranged inclined by an angle of inclination with respect to one another.

13. A frictional damper according to claim 10, wherein the through opening has a cross section perpendicular with respect to the longitudinal axis, the cross section being variable along the longitudinal axis.

14. A frictional damper according to claim 1, wherein the housing has a damping housing section.

15. A frictional damper according to claim 14, wherein the housing is formed exclusively by the damping housing section.

16. A frictional damper according to claim 14, wherein the frictional damper has a first fastening element for fastening to a pivotable part, the first fastening element being arranged on the damping housing section.

17. A frictional damper, comprising:
a housing having a longitudinal axis;
a plunger movable along the longitudinal axis;
a frictional unit for generating a frictional force on the plunger, the frictional unit comprising at least one friction lining for bearing rubbingly against the plunger, the frictional unit further comprising a friction lining carrier, the at least one friction lining being held on the friction lining carrier, the friction lining carrier being arranged such that the friction lining carrier is movable relative to the plunger in the housing between a pulled-out position and a pushed-in position, wherein a pulled-out friction acts in the pulled-out position, the pulled-out friction being different from a pushed-in friction which acts in the pushed-in position, the friction lining carrier having a through opening, the plunger being guided through the through opening, wherein the through opening has a contour which is asymmetrical at least in sections perpendicular with respect to the longitudinal axis.

18. A frictional damper, comprising:
a housing having a longitudinal axis;
a plunger movable along the longitudinal axis;
a frictional unit for generating a frictional force on the plunger, the frictional unit comprising at least one friction lining for bearing rubbingly against the plunger, the frictional unit further comprising a friction lining carrier, the at least one friction lining being held on the friction lining carrier, the friction lining carrier being arranged such that the friction lining carrier is movable relative to the plunger in the housing between a pulled-out position and a pushed-in position, wherein a pulled-out friction acts in the pulled-out position, the pulled-out friction being different from a pushed-in friction which acts in the pushed-in position, the friction lining carrier having a through opening, the plunger being guided through the through opening, wherein the through opening has a friction lining receptacle for the at least one friction lining.

* * * * *